United States Patent [19]

Breckner

[11] Patent Number: 4,785,841
[45] Date of Patent: Nov. 22, 1988

[54] BLADDER VALVE

[75] Inventor: Raymond A. Breckner, Richmond, Canada

[73] Assignee: Innovac Technology Inc., Vancouver, Canada

[21] Appl. No.: 177,988

[22] Filed: Apr. 5, 1988

[51] Int. Cl.[4] .......................... F16K 7/07; B08B 3/04; B08B 9/02
[52] U.S. Cl. .................. 137/15; 134/167 C; 134/169 C; 134/172; 137/240; 222/148; 251/5; 251/61.1
[58] Field of Search ........... 134/166 C, 167 C, 167 R, 134/169 C, 172; 137/15, 240; 222/148; 251/5, 61.1

[56] References Cited

U.S. PATENT DOCUMENTS

| | | | |
|---|---|---|---|
| 2,964,285 | 12/1960 | Bardet | 251/5 |
| 3,007,416 | 11/1961 | Childs | 251/5 |
| 3,039,733 | 6/1962 | Mattioli | 251/5 |
| 3,494,588 | 2/1970 | Kisling | 251/5 |
| 3,693,841 | 9/1972 | Hansen | 251/61.1 |
| 4,268,005 | 5/1981 | Raftis | 251/5 |
| 4,345,735 | 8/1982 | Regan | 251/5 |

FOREIGN PATENT DOCUMENTS 824365 11/1959 United Kingdom ............... 251/5

Primary Examiner—George L. Walton
Attorney, Agent, or Firm—C. A. Rowky

[57] ABSTRACT

A self clearing bladder valve is provided by concentric flexible and expandable bladder sleeves, the inner sleeve defining the passage through the valve. Flushing fluid is directed into an annular chamber between the bladder sleeves and through apertures through the inner sleeve into the passage for material passing through the valve to lubricate the passage and tend to force material out of the passage. The flushing fluid is delivered to the chamber between the bladder sleeves more quickly than it escapes through the apertures to the pressure in the annular chamber increases forcing the inner sleeve into the passage to restrict same as it is being flushed by fluid. Normally the flushing fluid will be directed into the annular chamber and through the apertures into the passage immediately before the valve is fully closed.

8 Claims, 1 Drawing Sheet

BLADDER VALVE

FIELD OF THE INVENTION

The present invention relates to a bladder valve, more particularly the present invention relates to a self clearing bladder valve.

BACKGROUND TO THE PRESENT INVENTION

Bladder valves of various kinds have been know and used for many years. One form of bladder valve is shown in U.S. Pat. No. 4,268,005 issued May 19, 1981 to Raftis. A pump incorporating bladder valves is shown in U.S. Pat. No. 3,007,416 issued Nov. 7, 1961 to Childs.

It will be apparent that bladder valves are used for a variety of different applications. In the Childs patent the bladder valves are use as a heart pump, however this type of valve is particularly suited for handling material in slurry form such as metallic ores, sand, coal, wood chips, etc. and is most frequently used for these purposes.

It has also been proposed to incorporate bladder valves in a pump for frail material such as a fish pump as shown in U.S. patent application Ser. No. 082,508 filed Aug. 8, 1987 by Breckner (the same inventor as the current application.)

When bladder valves are used particularly with frail material such as fish problems may be encountered with the bladders squeezing the fish and possibly damaging same when the bladders are inflated to close the valve passage and the product (fish) is in the passage as it is being closed. Also the abrasive nature of some materials normally passing through these valves causes wear and thus clearing at least some of this material from the valve before closing can increase valve life.

BRIEF DESCRIPTION OF THE PRESENT INVENTION

It is an object of the present invention to provide an improved bladder valve having a self flushing action.

Broadly the present invention relates to a bladder valve comprising an inner flexible bladder sleeve telescoped in concentric relationship in an outer flexible bladder sleeve, said inner bladder sleeve defining the principal passage for material through said valve when said valve is open, apertures through said inner bladder sleeve leading to said passage, means for directing fluid between said inner and outer bladder sleeves and through said apertures into said passage and means for directing fluid under pressure against the outside of said outer flexible bladder sleeve to collapse said inner and outer bladder sleeves and close said passageway.

Preferably a closed hollow cylindrical chamber is formed between said inner and outer bladder sleeves and said means for directing fluid directs fluid into said chamber.

Preferably said means for directing fluid will comprise an annular manifold extending about the circumference of said valve adjacent one axial end of said valve and opening into said hollow cylindrical chamber.

The size and combined total area of the apertures is coordinated with the amount of flushing fluid fed to the valve so that the pressure in the chamber between the two sleeves increases causing the volume of the chamber to expand by forcing the inner bladder sleeve into the valve passage to constrict the flow through the valve and at the same time increase the ratio of flushing fluid to slurry or the like passing through the valve because of the smaller size of the passage for the slurry due to the movement of the inner sleeve into the passage and the faster flow of flushing fluid as the pressure in the chamber increases.

BRIEF DESCRIPTION OF THE DRAWINGS

Further features, objects and advantageous will be apparent from the following detailed description of the preferred embodiments of the present invention taken in conjunction with the accompanying drawings in which.

DESCRIPTION OF THE PREFERRED EMBODIMENTS

The present invention is described hereinbelow in relation to a fish pump, but it will be apparent it may be applied to other uses.

Figure 1:
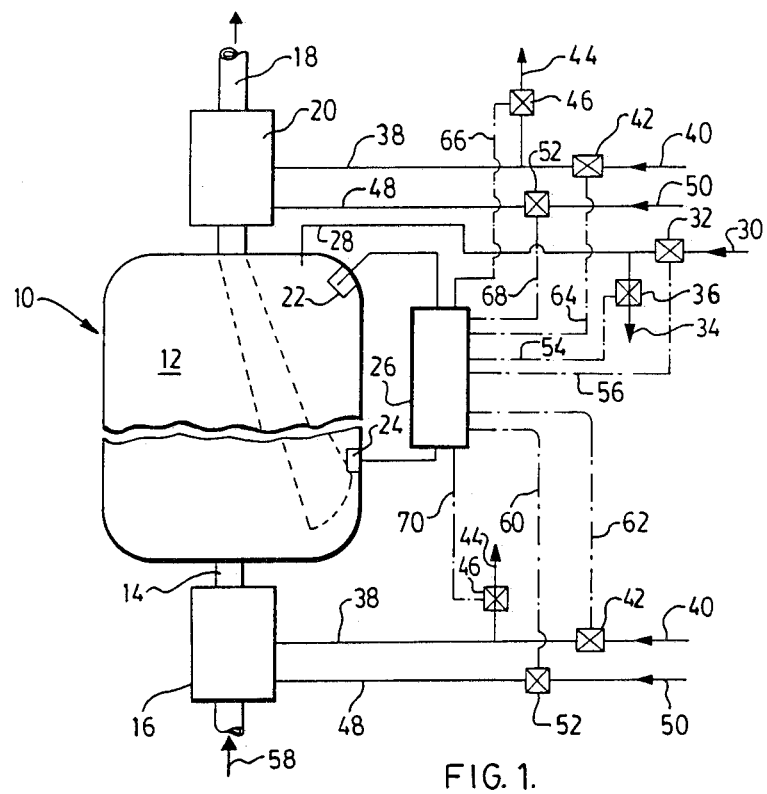
FIG. 1 is a schematic illustration of a fish pump in which the present invention is incorporated.

As shown in FIG. 1 the fish pump 10 is similar to the pump shown in the above referred to patent application of Breckner and includes a main chamber 12 having an inlet 14 with an inlet bladder valve 16 and an outlet 18 with an outlet bladder valve 20. Suitable level sensing device such as the sensors 22 and 24 sense the maximum and minimum level of the slurry in the chamber 12 (if desired the sensor 24 may be eliminated and replaced by suitable timer or other means sensing the lower limit and adapted to shut off the pressure portion of the pumping cycle.)

The outputs from the sensors 22 and 24 are preferably fed to a control computer 26, assuming a computer is to control the operation of the pumping system.

The chamber 12 is connected to a source of air under positive or negative pressure via the line 28 which may be connected to a source of air under pressure as indicated by the arrow 30 via valve 32 or a source or negative pressure as indicated by the arrow 34 via valve 36.

The valves 16 and 20 are essentially the same each is provided with an operating fluid entry and exit pipe 38 which may be connected to a source of operating fluid under pressure as indicated by the 40 via valve 42 or exhausted as indicated by the arrow 44 under control of the valve 46 (the same reference numerals have been used to indicate like parts of the valves 16 and 20.) The operating fluid passing through line or pipe 38 may be any suitable fluid compressible or incompressible, but water is preferred when the valves are used in a fish pump as illustrated.

In some cases it may be necessary to apply negative pressure to the line 38 when the valve is open to insure the valve remain in open condition, for example when negative pressure is applied to the chamber 12 and this pressure is transmitted to the material passage through the valve eg. the passage through inlet valve 16 when material is being sucked therethrough by the negative pressure applied to the inside of chamber 12.

A flushing fluid line 48 is connected to each of the valves 16 and 20 from a source of flushing fluid under positive pressure as indicated by the arrow 50 under the control of the valve 52.

The operation is preferably controlled by the computer 26 which is triggered by the sensors 22 and 24. Initially the valve 20 will be closed and the valve 16 open and the line 28 will be connected to the source of negative pressure 34 by the control lines 54 and 56 opening the valve 36 and closing the valve 32. The reduced pressure thus generated in the chamber 12 will draw material (a slurry of fish in the current example) through the inlet pipe 14 as indicated by the arrow 58.

When the chamber 12 has filled to the desired level the level sensor 22 will trigger the computer 26 to close the valve 36 and thus disconnect the chamber 12 from the source of negative pressure. Thereafter the computer 26 will via control line 60 open the valve 52 to apply flushing fluid to the valve 16 and after a preselected time the valve 42 controlled via line 62 is activated to apply operating fluid under pressure to the operating chamber of valve 16 to complete the closing of the valve 16 as will be described below.

After the inlet valve 16 has been closed the line 28 may be connected to the source of air under positive pressure by opening the valve 32 and the outlet valve 20 opened by closing the valve 42 under the control of the control line 64 to disconnect from the source of operating fluid under pressure and opening the valve 46 under control of the control line 66 to vent the operating fluid from the operating chamber of the valve.

After the chamber 12 has been emptied to the required degree as sensed for example by the sensor 24 the valve 32 is closed under control from the line 56 and the valve 52 is opened by the computer 26 through control line 68 to admit flushing fluid via line 48 into the valve 20 and then after a preselected flushing period the valve 20 is closed by closing valve 46 via control line 66 and opening valve 42 via control line 64.

The chamber 12 may then be reconnected to the source of negative pressure 34 by opening the valve 36 and then the valve 16 opened by opening valve 46 via control line 70 and the pumping cycle repeated.

Figure 2:
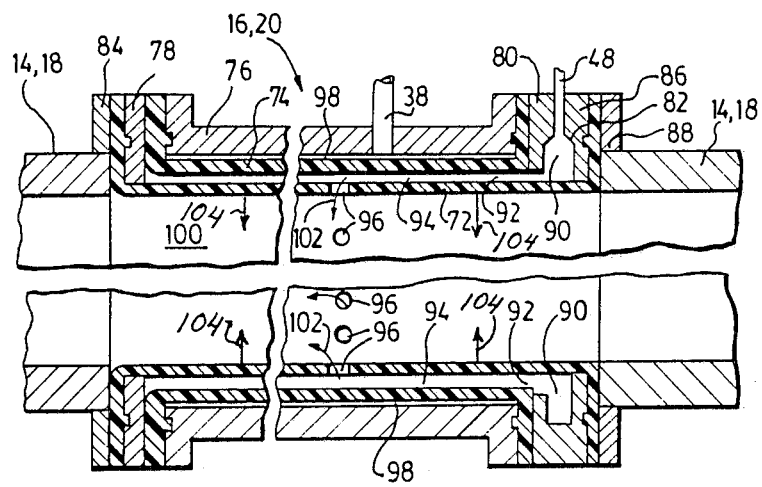
FIG. 2 is a longitudinal axial section through a bladder valve incorporating the present invention.

The use of flushing fluid introduce via lines 48 into the valves 16 and 20 will be described in more detail hereinbelow with respect to FIG. 2 which illustrates in longitudinal section the valve 16 or 20 (both valve are essentially the same structurally.)

It will be noted that the valves 16,20 are composed of an inner collapsible bladder sleeve 72 telescopingly received within an outer collapsible bladder sleeve 74, which in turn is telescopingly received within a housing 76. The ends of bladder valve sleeve 74 are clamped and sealed to the housing 76 at one axially end of the valve 16,20 by a plate 78 and at the other end of the valve 16,20 via an annular inner wall 80 of an annular manifold 82.

The inner bladder sleeve 72 is clamped and sealed to plate 78 by an annular clamping flange 84 and is clamped and sealed at the opposite end of the valve 16,20 against an annular outer wall 86 of the manifold 82 by a second annular clamping flange 88.

The manifold 82 is formed with an annular chamber 90 extending circumferentially around the valve 16,20. This chamber 90 is connected via pipe 48 to the source of flushing fluid 50. The flushing fluid may be any suitable fluid depending on the material being passed through the valve. For the fish pump shown as an application for the valve the flushing fluid preferably will be water.

In the illustrated arrangement the outer annular wall 86 of the manifold 82 is longer in the radial direction than the inner annular wall 80 of the manifold 82. This difference in radial length of the walls 86 and 80 provides an annular passage 92 leading from the manifold chamber 90 into an annular expandable chamber 94 formed between the sleeve 72 and 74.

The inner sleeve 72 is provided with a plurality of apertures 96 which in the illustrated arrangement have been shown as extending in a circumferential row around the sleeve 72, however they may be otherwise distributed for example there may be several rows or they may be randomly positioned. It is preferred to have the apertures 96 located spaced significantly from both axial ends of the valve 16, 20 so that flow will tend to occur in both direction or preferentially in the direction of flow through the valve.

An annular valve chamber 98 is formed between the housing 76 and the outer bladder sleeve 74 and this chamber 98 is connected to the pipe 38 which in turn is connected to the source of operating fluid under pressure 40 or vented or to a source of negative pressure as indicated by the arrow 44.

The main passage 100 for material (in the illustrated embodiment a slurry of fish) extends axially through the valve 16, 20 through the inner sleeve 72. Thus the valve has concentrically positioned a central longitudinal passage 100 through the inside of sleeve 72, an annular expandible chamber 96 surrounding the sleeve 72, an annular outer sleeve 74 surrounding and providing the outer wall of the chamber 96, an annular expandible operating chamber 98 surrounding the outer sleeve 74 and an annular housing 76 surrounding and forming the outer wall of the chamber 98.

The size of the apertures 96 and the total combined area of all the apertures are such that flow from the chamber 94 through the apertures into the passage 100 as indicated by the arrows 102 is normally slower than the flow of flushing fluid into the chamber 94 thereby causing the pressure to build in the chamber 94 and the chamber 94 to expand and force the inner sleeve 76 away from the outer sleeve 76 and into passage 100 as indicated by the arrows 104 to cause the passage 100 to constrict and tend to choke off flow therethrough.

The operation of the valve 16,20 is as follows.

Before the valve is closed the rate of flow through the line 14,18 is significantly reduced or stopped, the valve 52 is opened (this may occur before flow through the line 14,18 has been slowed or stopped, but continues after the flow has been slowed.) The flushing fluid passes through the annular passage 90 in manifold 82, through the annular passage 92 into the chamber 94 and out through the apertures 96 into the passage 100 as indicated by the arrows 102. As indicated above the flow into the chamber 94 is greater than the flow through the apertures 96 so that the flexible inner sleeve 72 is forced into the passage 100 by the build up of pressure in the chamber 94 expanding the chamber 94 i.e. the amount of fluid in the chamber 94 increases thereby increasing the size of chamber 94 by collapsing the sleeve into the passage 100. After a preselected period of time sufficient to significantly choke or close off the passage 100 and to dilute and flush the material from the passage 100 fluid under pressure is applied to the chamber 98 through the pipe 38 from the source of fluid under pressure 40. This inflates the outer bladder sleeve 74 tending to squeeze the fluid from chamber 94 through the passages 96 and into the passage 100 and move the inner bladder 72 to close the passage 100.

The flow of flushing fluid through line 48 and into the chamber 94 will automatically stop when the pressure in chamber 98 forces the outer bladder sleeve 74 against the inner bladder sleeve to close off the passage 94. This action occurs when the pressure in chamber 98 is higher than the pressure in chamber 94.

If the fluid in chamber 94 and 98 are at the same pressure it may be desireable to close the valve 52 after inflation of the outer bladder sleeve has commenced and the valve 16, 20 is moving toward a closed position closing the passage 100.

Opening of the valve 16,20 is the same as with a conventional bladder valve with the fluid being exhausted from the chamber 98 and if desired a negative pressure applied to the chamber 98 to hold the out sleeve 74 in open position.

Having described the invention modifications will be evident to those skilled in the art without departing from the spirit of the invention as defined in the appended claims.

I claim:

1. A bladder valve comprising an inner flexible bladder valve sleeve telescoped within an outer flexible bladder valve sleeve, said inner bladder sleeve defining the periphery of a main passage for material passing through said valve when said valve is open, aperture means extending through said inner bladder sleeve into said passage, first means for directing flushing fluid under pressure between said inner and outer bladder sleeves while moving said inner bladder toward said passage and forcing said flushing fluid through said aperture means and into said passage for flushing said passage and second means for directing operating fluid at a selected time for applying pressure against the outside of said outer bladder sleeve to collapse said outer bladder sleeve toward said inner bladder sleeve when said passage is to be closed.

2. A bladder valve as defined in claim 1 wherein the size and total area of said aperture means are related to the flow of flushing fluid between said inner and outer bladder sleeves to retard the flow from between said bladder sleeves and cause an increase in pressure between said inner and outer bladder sleeves and said inner bladder sleeve to be forced into said passage to constrict said passage when flushing fluid is directed under pressure between said bladder sleeves.

3. A bladder valve as defined in claim 2 wherein a closed annular chamber is formed between said inner and said outer bladder sleeves, said annular chamber communicating through said aperture means with said passage.

4. A bladder valve as defined in claim 3 wherein said means for directing fluid comprises a manifold opening into said annular chamber adjacent one axial end of said chamber.

5. A bladder valve as defined in claim 4 wherein said aperture means is located spaced from both axial ends of said passage.

6. A bladder valve as defined in claim 5 further comprising a housing encircling said outer bladder sleeve and wherein an operating chamber is formed between said outer bladder sleeve and said housing, means connecting said operating chamber to a source of operating fluid under pressure for directing said operating fluid under pressure to apply pressure against said outer bladder sleeve to force said outer bladder sleeve toward said inner bladder sleeve and into said passage to close said passage.

7. A bladder valve as defined in claim 6 wherein said housing, said operating chamber, said outer bladder sleeve, said annular chamber, said inner bladder sleeve and said passage are concentrically arranged.

8. A method of operating a bladder valve having concentric inner and outer bladder sleeves with an annular chamber therebetween and a passage for material through said valve concentric with said sleeves and extending through said inner sleeve, there being aperture means through said inner sleeve connecting said annular chamber with said passage, said method comprising closing said valve by a first means for applying flushing fluid under pressure to said annular chamber at a rate faster than said flushing fluid escapes from said annular chamber into said passage through said aperture means, increasing the pressure in said annular chamber sufficiently to force said inner sleeve to move into and constrict said passage while flushing said passage with flushing fluid entering said passage through said aperture means for flushing said passage and completing the closing of said valve by a second means for applying operating fluid under pressure at a selected time against the outside of said outer sleeve to force said outer sleeve toward said inner sleeve and thereby close said passage to stop flow therethrough.

* * * * *